United States Patent
Brink

(10) Patent No.: US 10,969,752 B1
(45) Date of Patent: Apr. 6, 2021

(54) SYSTEM AND APPARATUS FOR ESTIMATING STATES OF A PHYSICAL SYSTEM

(71) Applicant: Government of the United States, as represented by the Secretary of the Air Force, Wright-Patterson AFB, OH (US)

(72) Inventor: Kevin Brink, Fort Walton Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 154 days.

(21) Appl. No.: 16/243,561

(22) Filed: Jan. 9, 2019

Related U.S. Application Data

(60) Provisional application No. 62/653,782, filed on Apr. 6, 2018.

(51) Int. Cl.
*G05B 13/04* (2006.01)
*G06F 17/16* (2006.01)
*H04L 29/08* (2006.01)

(52) U.S. Cl.
CPC .......... *G05B 13/048* (2013.01); *G06F 17/16* (2013.01); *H04L 67/12* (2013.01)

(58) Field of Classification Search
CPC ..... G01C 21/165; C05B 13/048; G06F 17/16; H04L 67/12; G05B 13/048
See application file for complete search history.

(56) References Cited

U.S. PATENT DOCUMENTS

| 5,991,525 A | * | 11/1999 | Shah | ...................... G05B 13/04 700/29 |
| 6,285,971 B1 | * | 9/2001 | Shah | ...................... G05B 13/04 700/38 |

(Continued)

OTHER PUBLICATIONS

Grewel, M. S., and Andrew, A. P., Kalman Filtering Theory and Practice Using Matlab, 2nd ed., Wiley, New York, 1977, pp. 309-317.

(Continued)

*Primary Examiner* — Thomas C Lee
*Assistant Examiner* — Anzuman Sharmin
(74) *Attorney, Agent, or Firm* — AFMCLO/JAZ; Matthew D. Fair

(57) ABSTRACT

Properties of a physical system are measured and used to update estimated states of the system in an iterative manner. At each iteration, a state update weight is assigned for each state and the states are predicted from previous estimated states. System states are predicted from prior estimates and then updated dependent upon the measurements and the state update weights to provide updated estimated states. In addition, a prior covariance matrix of state errors is updated dependent upon the state update weights to provide an estimation error covariance matrix that is consistent with the updated estimated states. The updated state may be equivalent to a weighted sum of a prior estimated state and an initial updated estimated state. The approach provides improvements to a variety of estimators, including least squares estimators and estimators such as the Extended, Schmidt and Unscented Kalman Filters and the Rao-Blackwellized Particle Filter.

23 Claims, 4 Drawing Sheets

(56) References Cited

U.S. PATENT DOCUMENTS

| | | | | |
|---|---|---|---|---|
| 7,180,443 | B1* | 2/2007 | Mookerjee | G01S 13/723 342/162 |
| 7,706,947 | B2* | 4/2010 | Bozem | B66F 17/003 701/50 |
| 8,229,661 | B2* | 7/2012 | Monrocq | G01C 21/165 701/510 |
| 8,515,712 | B1* | 8/2013 | Mookerjee | G01S 5/16 702/190 |
| 2005/0251328 | A1* | 11/2005 | Merwe | G01C 21/165 701/472 |
| 2007/0213933 | A1* | 9/2007 | Zeng | G01C 21/165 701/510 |
| 2010/0274368 | A1* | 10/2010 | Terndrup | G05B 13/021 700/33 |
| 2012/0010732 | A1* | 1/2012 | Stewart | G05B 13/048 700/19 |
| 2012/0232780 | A1* | 9/2012 | Delson | A63F 13/803 701/400 |
| 2012/0271528 | A1* | 10/2012 | Pekar | G05B 13/048 701/101 |
| 2018/0010914 | A1* | 1/2018 | Hardt | G01C 21/165 |
| 2018/0169702 | A1* | 6/2018 | Houston | G01D 5/145 |
| 2020/0164408 | A1* | 5/2020 | Delson | H02K 33/00 |
| 2020/0339154 | A1* | 10/2020 | Stangl | B60W 30/09 |

OTHER PUBLICATIONS

Brink, K., and Soloviev, A., "Filter-Based Calibration for an IMU and Multi-Camera System," Proceedings of the 2012 IEEE/ION Position, Location and Navigation Symposium, Apr. 2012, pp. 730-739.

Bierman, G. J., Factorization Methods for Discrete Sequential Estimation, Academic Press, New York, 1977, pp. 162-182.

Crassidis, J., and Junkins, J., Optimal Estimation of Dynamic Systems, Chapman and Hall/CRC Press, Boca Raton, FL, 2004, pp. 192-198.

Kalman, R. E., "A New Approach to Linear Filtering and Prediction Problems," ASME Journal of Basic Engineering, vol. 82, No. 1, 1960, pp. 35-45.

Maybeck, P. S., Stochastic Models, Estimation, and Control, Academic Press, New York, 1979, pp. 296-305, Chap. 6.

Schmidt, S. F., "Application of State Space Methods to Navigation Problems," Advanced Control Systems, Advances in Control Systems, vol. 3, 1966, pp. 293-340.

Bellantoni, J. F., and Dodge, K. W., "A Square Root Formulation of the Kalman-Schmidt Filter," AIAA Journal, vol. 5, No. 7, 1967, pp. 1309-1314.

Julier, S. J., and Uhlmann, J. K., "New Extension of the Kalman Filter to Nonlinear Systems," Proceedings of SPIE 3068, Signal Processing, Sensor Fusion, and Target Recognition VI, vol. 182, Jul. 1997.

Zarchan, P., and Musoff, H., Fundamentals of Kalman Filtering: A Practical Approach, 4th ed., AIAA, Reston, VA, 2015, Chap. 20, pp. 777-815.

Hu, X., Bao, M., Zhang, X. P., Guan, L., and Hu, Y. H., "Generalized Iterated Kalman Filter and Its Performance Evaluation," IEEE Transactions on Signal Processing, vol. 63, No. 12, Jun. 2015.

Brown, R., and Hwang, P., Introduction to Random Signals and Applied Kalman Filtering, 3rd ed., Wiley, New York, 1997, pp. 361-367.

Woodbury, D. P., and Junkins, J. L., "On the Consider Kalman Filter," AIAA Guidance, Navigation, and Control Conference, AIAA Paper 2010-7752, Aug. 2010.

Stauch, J., and Jah, M., "Unscented Schmidt-Kalman Filter Algorithm," Journal of Guidance, Control, and Dynamics, vol. 38, No. 1, 2015, pp. 117-123.

Mirzaei, F., and Roumeliotis, S., "A Kalman Filter-Based Algorithm for IMU—Camera Calibration: Observability Analysis and Performance Evaluation," IEEE Transaction on Robotics, vol. 24, No. 5, 2008, 1143-1156.

Kelly, J., and Sukhatme, G., "Visual-Inertial Simultaneous Localization, Mapping and Sensor-to-Sensor Self-Calibration," Proceedings of the IEEE International Symposium on Computational Intelligence in Robotics and Automation (CIRA'09), IEEE Publ., Piscataway, NJ, 2009, pp. 360-368.

Bailey, T., Nieto, J., Guivant, J., Stevens, M., and Nebot, E., "Consistency of the EKF-SLAM Algorithm," Proceedings of the 2006 IEEE/RSJ International Conference on Intelligent Robots and Systems, IEEE Publ., Piscataway, NJ, Oct. 2006, pp. 3562-3568.

Hong, S., Lee, M. H., Chun, H.-H., Hong Kwon, S., and Speyer, J. L., "Experimental Study on the Estimation of Lever Arm in GPS/INS," IEEE Transactions on Vehicular Technology, vol. 55, No. 2, Mar. 2006, pp. 431-448.

Venable, D. T., "Improving Real World Performance for Vision Navigation in a Flight Environment," Ph.D. Thesis, U.S. Air Force Inst. of Technology, Wright-Patterson AFB, OH, 2016.

Novoselov, R. Y., Herman, S. M., Gadaleta, S. M., and Poore, A. B., "Mitigating the Effects of Residual Biases with Schmidt-Kalman Filtering," Proceedings of the 7th International Conference on Information Fusion, IEEE Publ., Piscataway, NJ, Jul. 2005, pp. 356-358.

Bar-Itzhack, I., and Nathan, J., "Consider-Filters for Recursive Attitude Determination," Guidance, Navigation, and Control Conference, AIAA Paper 1994-3675, 1994.

Yang, Y., Yue, X., and Dempster, A. G., "GPS-Based Onboard Real-Time Orbit Determination for Leo Satellites Using Consider Kalman Filter," IEEE Transactions on Aerospace and Electronic Systems, vol. 52, No. 2, Apr. 2016, pp. 769-777.

Pittelkau, M. E., "Attitude Determination Kalman Filter with a $1/f$ Flicker Noise Gyro Model," Proceedings of the 26th International Technical Meeting of the Satellite Division of the Institute of Navigation, ION GNSS+ ION, Sep. 2013, pp. 2143-2160.

Solà, J., Vidal-Calleja, T., Civera, J., and Montiel, J., "Impact of Landmark Parametrization on Monocular EKF-SLAM with Points and Lines," International Journal of Computer Vision, vol. 97, No. 3, 2012, pp. 339-368.

Parsley, M. P., and Julier, S. J., "Avoiding Negative Depth in Inverse Depth Bearing-Only SLAM," Proceedings of the 2008 IEEE/RSJ International Conference on Intelligent Robots and Systems, IEEE Publ., Piscataway, NJ, Sep. 2008, pp. 2066-2071.

Z. Yang and S. Shen, "Monocular visual-inertial fusion with online initialization and camera—IMU calibration," 2015 IEEE International Symposium on Safety, Security, and Rescue Robotics (SSRR), West Lafayette, IN, 2015, pp. 1-8.

* cited by examiner

FIG. 1 *(Prior Art)*

SYSTEM AND APPARATUS FOR ESTIMATING STATES OF A PHYSICAL SYSTEM

CROSS-REFERENCE TO RELATED APPLICATION(S)

The present application claims the benefit of U.S. Provisional Application No. 62/653,782, filed Apr. 6, 2018, the contents of which are hereby incorporated by reference.

STATEMENT OF GOVERNMENT INTEREST

The invention described herein may be manufactured, used, and licensed by or for the Government of the United States for all governmental purposes without the payment of any royalty.

BACKGROUND

A state estimator or observer is a system that provides an estimate of the internal state of a system from measurements of the input and output of the real system. In practice, a state estimator may be implemented using digital signal processing.

A state estimator may be used with a wide range of systems, including physical systems such as vehicles, industrial processes, biological systems, robots, etc. For example, when the physical system is a vehicle, such as an aircraft or spacecraft, the internal states may represent position, orientation, and motion of the vehicle. For a sensing system, such as an inertial measurement unit, the internal states may also include sensor gains and biases. In some applications, the system is subject to inputs—either natural or controlled. For example, the estimated states may be provided to a control system that seeks to control behavior of the physical system. Often, the physical state of the system cannot be determined by direct observation, in which case the internal state must be inferred from measurements of the inputs and outputs.

In some cases, the internal states may be estimated from a time history of the measurements. However, since the internal states encapsulate the current state of the system, the internal states may be estimated recursively from previous internal states together with knowledge of any inputs to the system. An example recursive estimator is a discrete Kalman filter, which may be implement using digital electronics.

When the physical system is non-linear with respect to the measurements or to internal state propagation, an extended Kalman filter (EKF), or a variant thereof, may be used.

Due to the nature of the EKF, and other Bayesian filters, some states and systems are prone to linearization errors that impact performance. The errors cause filter overconfidence and potentially divergence. The Schmidt-Kalman filter (SKF) attempts to address these inconsistencies by fixing the estimated value of specific states (nuisance states/parameters) effectively reweighting the update on those states to zero. For certain systems, this can generate much better results, as the system behaves "linearly enough" with those states held fixed in the estimator. The SKF incorporates the uncertainty in the problematic states without having to actively estimate their values, leading to better estimates of the states one does care about. However, this concept is only applicable to fixed states (or states with very slow uncertainty growth with respect to the life of the filter) where the user does not need a better estimate of the problematic states themselves. These restrictions are rather limiting.

Accordingly, there is a need for an estimator for physical systems with slowly varying nuisance states.

In addition, the Schmidt filter is limited to static or very slow states, so there is a need to provide an estimator filter with similar properties but which can estimate states, such as 'parameter-like' states, which vary faster.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
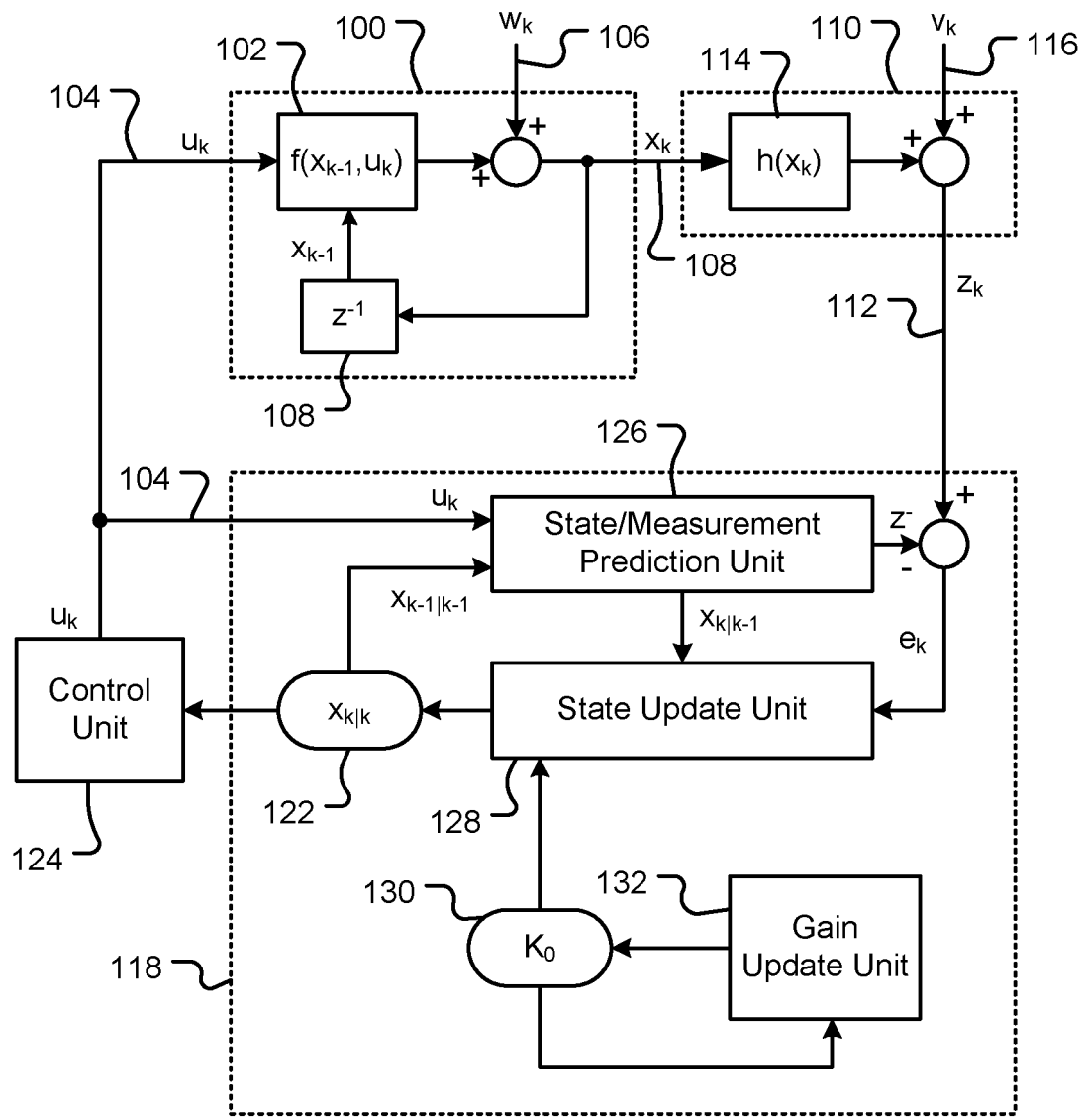
FIG. 1 is a block diagram of a state estimation apparatus for a physical system.

The various methods, systems, apparatuses, and devices described herein generally relate to state estimation for a physical system.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

FIG. 1 is a block diagram of a state estimation apparatus for a system. Time varying properties of the system, such as physical system 100 illustrated in block diagram form in FIG. 1, may be represented at any given time by a set of states. Physical system 100 may be, for example, a vehicle, industrial process, robotic system, biological system, image processing system, or information system.

While the system may be a continuous time system, its behavior may be characterized by its behavior at discrete times. Mathematically, at discrete time k, the states are represented by a state vector $x_k$. The states at a future time may be determined from the state vector and knowledge of any inputs to the system. In particular, the state vector $x_k$ (120) at discrete time k can be written as $$x_k = f(x_{k-1}, u_k) + w_k. \quad (1)$$

where the function f, depicted as block 102, is a linear or non-linear state transition function, $u_k$ (104) is a vector of inputs, $x_{k-1}$ is a state vector at discrete time k−1, and $w_k$ (106) is noise vector. The inputs $u_k$ may be naturally occurring inputs or inputs resulting directly or indirectly from control inputs.

While discrete implementations of the estimator are disclosed herein, it is to be recognized that, in general, the approach may be used with discrete or continuous systems. One embodiment of the estimator uses a weighted sum of initial updates and prior estimates obtained to minimize a mean square error. This approach may be used to provided improvements to many existing filters, such as the extended Kalman filter (EKF), the unscented Kalman filter (UKF) and the Rao-Blackwellized Particle Filter (which has a linear update portion within the particle filter framework) and variants thereof.

Referring again to FIG. 1, block 108 denotes a delay of one-time step. Often, the states themselves cannot be sensed directly. However, other system properties that depend upon the states can be sensed by a sensing system denoted as block 110. The sensed signals, 112, at discrete time k, are given by $$z_k = h(x_k) + v_k \quad (2)$$

where h, shown as block 114, is a linear or non-linear measurement function and $v_k$ (116) is noise vector.

Often, the sensed signals comprise electrical signals provide by sensors or transducer. that are sampled at discrete times. State estimator 118 receives sensed signals 112 and input signals 104 and from them determines an estimate 122 of state vector 120. The estimated state vector 122 may be used by control system 124 to generate (directly or indirectly) system input signals 104. These signals may be adjusted by control system 124 to drive state vector 120 to a desired vector. The state estimator 118, which may be implemented in a hardware processor, receives signals $z_k$ from a sensing system such as sensing system 110. For example, a robotic manipulator or spacecraft may be moved in a desired path by a control system. In other applications, there may be no control inputs or the inputs may be as a result of natural phenomena.

The present disclosure relates to an improved state estimator 118.

In the example shown in FIG. 1, state estimator 118 is configured as a state/measurement prediction unit 126, which models the physical system 100 and predicts the state vector, and a state update unit 128, which updates the predicted state vector based on new measurements 112.

The predicted state is updated dependent upon Kalman gain matrix $K_0$ (130). The gain matrix is updated recursively in gain calculation unit 132.

Figure 2:
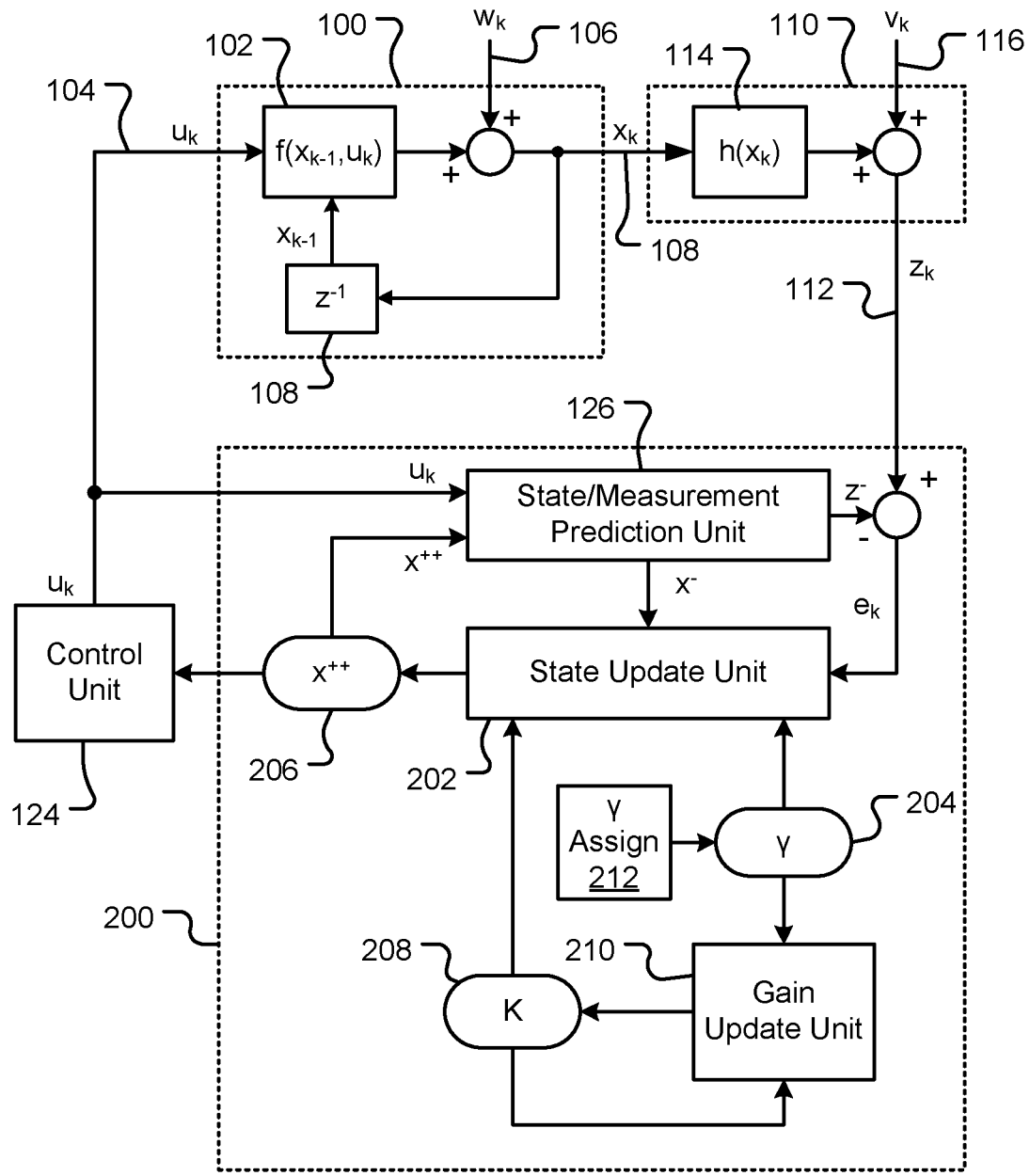
FIG. 2 is a block diagram of a state estimation apparatus for a physical system, in accordance with a representative embodiment.

FIG. 2 is a block diagram of an improved state estimator 200 in accordance with embodiments of the disclosure. The disclosed state estimator 200 is an iterative state estimator for the states of the physical system and provides an improvement to the known Kalman filter (for linear systems) or extended Kalman filter (for non-linear systems). For each iteration, the estimator is configured for predicting current states of the physical system from previous states of the physical system to provide predicted states. For each predicted state of the predicted states, a predicted state is updated dependent on the difference between predicted measurement signals and actual sensor signals. In the Kalman filter, the predicted state is updated dependent upon a Kalman gain matrix and measurements of the system, to provide estimated states. In the disclosed state estimator, state update unit 202 is further dependent upon state update weights 204. For a system with n states, the update weighting factors are designated by a state weighting vector $$\gamma=[\gamma_0 \gamma_1 \ldots \gamma_{n-1}]^T. \quad (4)$$

In each iteration, state update unit 202 provides an updated estimate 206 of the state vector. The update is dependent upon a gain matrix 208 provided by gain update unit 210. In the disclosed state estimator, the gain matrix 208 is additionally dependent upon the state update weights 204. Thus, state update unit 202 and gain update unit are improved compared to prior state estimators.

The state update weights may be varied for each state and for each update by weight assignment unit 212. The state update weight for each state is greater than or equal to zero and less than or equal to one. This approach provides an improvement to the known Kalman filter (KF) or extended Kalman filter (EKF) update step, and provides a user with significant flexibility in "tuning" the filter through the selection of the state update weights. The approach also provides an improvement to the Schmidt-Kalman filter (SKF), in which some states are not updated. Herein, the disclosed state estimator is referred to as a partial-update Schmidt-Kalman filter (PSKF).

The use of state update weights 204 can lead to estimator implementations that are robust, thereby expanding the degree of uncertainty or non-linearity the estimator can accommodate and leading to more accurate covariance values and state estimates.

For particular, fixed, values of the state update weights, the disclosed improvement reduces to the extended Kalman filter (EKF) and the Schmidt-Kalman filter (SKF). However, the ability of weight assignment unit 212 to select different state updates weights for different states and for different iterations provides an estimator that is far more flexible that either of the known approaches. Other minimum mean square error (MMSE) filters may also be obtained as special cases. The increased flexibility enables a user to produce more accurate and consistent state estimates. In addition, the improved estimator may be used in some applications where the EKF and SKF are ineffective. Thus, the operation of the state estimator is improved.

The PSKF allows for updates anywhere between 0% and 100% of the nominal filter update for any state and any update step. The weighting can be fixed or time varying (as a function of system observability), where problematic states receive lesser updates when they system requires and larger updates when good information is available. The PSKF is a generalization which includes several the standard filters (EKF, SKF) as special cases. This means the PSKF is always able to perform as well as the state of the art for those filters, and in many cases the PSKF will significantly outperform them.

Figure 3:
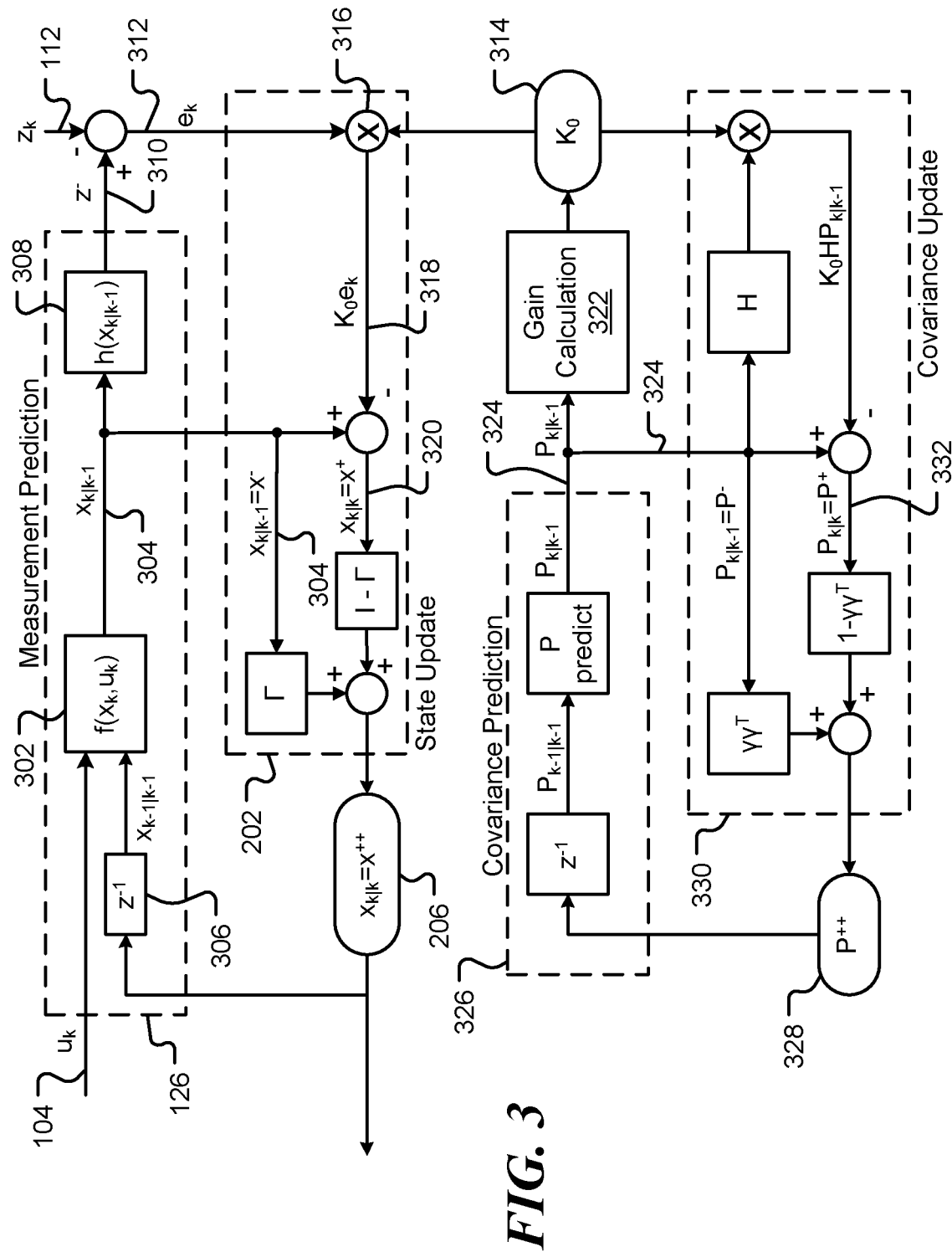
FIG. 3 is a further block diagram of a state estimation apparatus for a physical system, in accordance with a representative embodiment.

FIG. 3 is a further block diagram of a Kalman state estimation apparatus 118 for a physical system. State estimation apparatus 118 includes measurement prediction unit 126, state update unit 128, gain calculation unit 132, and covariance update unit 136. In the embodiment shown in FIG. 3, the improved estimator is implemented as a modification of a standard Kalman filter estimator. However, it is to be understood that the various operations or elements may be reorganized to provide mathematically equivalent implementations.

Measurement Prediction Unit. Measurement prediction unit 126 provides a new estimate $\hat{z}_k$ (310) of the measurement vector at discrete time k from a prior estimated state vector $\hat{x}_{k-1|k-1}$ (306) at discrete time k−1. Block 302 predicts the state vector $\hat{x}_{k|k-1}$ (304) from measurements prior to time k as $$\hat{z}_{k|k-1}=f(\hat{x}_{k-1|k-1},u_k), \quad (5)$$

where $\hat{x}_{k|k-1}$ is a state vector predicted from measurements prior to time k. Block 306 denotes a unit delay. Block 308 predicts the measurement vector 310 as $$\hat{z}_k=h(\hat{x}_{k|k-1}). \quad (6)$$

State Update Unit. In accordance with an embodiment of the disclosure, an update weighting factor is introduced for each state in the state update unit. The update weighting factors are designated by a state weighting vector $$\gamma=[\gamma_0 \gamma_1 \ldots \gamma_{n-1}]^T. \quad (7)$$

Writing the predicted state vector 304 at discrete time k as $\hat{x}^-=\hat{x}_{k|k-1}$ and the final estimated state vector 206 as $\hat{x}^{++}$, the update is:

$$\hat{x}^+=\hat{x}^-+K_0(\tilde{z}-\hat{z}^-)$$

$$\hat{x}^{++}=\Gamma\hat{x}^-+(I-\Gamma)\hat{x}^+ \quad (8)$$

where
  $\hat{x}^+$ (320) is an initial vector of estimated states,
  $\hat{x}^{++}=\hat{x}_{k|k}$ (206) is a final vector of estimated states,
  $\hat{x}^-=\hat{x}_{k|k-1}$ (304) is a vector of predicted states, predicted from a previous vector of estimated states,
  $\tilde{z}$ is a vector of sensed values dependent upon the actual physical states but subject to noise,
  $K_0$ (314) is a Kalman gain matrix, applied in (matrix) multiplier 316,
  $\hat{z}^-=h(\hat{x}^-)$ is the predicted measurement vector,
  $\tilde{z}-\hat{z}^-=e_k$ (312) is the measurement error
  and
  $\Gamma=$diag $(\gamma)$ is a diagonal matrix, with diagonal elements $\Gamma_{ii}=\gamma_i$ Thus, in one embodiment, the vector of estimated states is obtained by adding a second step to the standard Kalman update. This form is implemented in FIG. 3. The expression $\hat{x}^{++}=\Gamma\hat{x}^-+(I-\Gamma)\hat{x}^+$ describes a weighted sum of initial estimated state vector 320 and predicted state vector 304.

Equivalently, in a further embodiment, the vector of estimated states is determined as $$\hat{x}^{++}=\hat{x}^-+(I-\Gamma)K_0(\tilde{z}-\hat{z}^-)=\hat{x}^-+K(\tilde{z}-\hat{z}^-). \quad (9)$$

where $K=(I-\Gamma)K_0$ is a modified gain matrix (208 in FIG. 2, for example). In equation (9), the term $K(\tilde{z}-\hat{z}^-)$ represents an update to a predicted state $\hat{x}^-$. While this equation has been derived for an extended Kalman filter, corresponding equations are used in other estimators. The update is dependent upon the state update weights through matrix Γ and on the new measurements through the term $\tilde{z}$. While the update here is a product of again matrix K and an error term, the update may take other forms in other estimators.

The update is referred to as a generalized partial update. In component form, the estimated states are updated as $$\hat{x}_i^{++}=\gamma_i\hat{x}_i^-+(1-\gamma_i)\hat{x}_i^+=\hat{x}_i^++\gamma_i(\hat{x}_i^--\hat{x}_i^+), \quad (10)$$

which is a weighted sum of the predicted state and the initial updated state. Again, while equations (9) and (10) have been derived for an extended Kalman filter, this approach may be used for other estimators in which a state is predicted from previous measurements and then updated using new measurements. A number of such estimators are known in the art.

In the state update term, $\tilde{z}-\hat{z}$ is the difference between the predicted measurements 310 and the actual measurements 112 and is denoted as error vector 312. Error vector-312 and the Kalman gain $K_0$ (314) are multiplied in matrix multiplier 316 to provide an initial correction vector 318.

Gain Calculation Unit. The gain calculation unit 322 provides the Kalman gain matrix $K_0$ (stored at 314) given by $$K_0 = P^- H^T (R + H P^- H^T)^{-1}. \tag{11}$$

where $P^- = \langle (x-\hat{x}^-)(x-\hat{x}^-)^T \rangle = \langle e^- e^{-T} \rangle$ is a prediction error covariance matrix, $$H_k = \frac{\partial h}{\partial x} \bigg|_{\hat{x}_{k-1|k-1}}$$

is a matrix describing the dependence of the sensed values on the physical states, and $R = \langle vv^T \rangle$ is a covariance matrix of the sensor noise, where the angled brackets denote the expected value. It is noted that $$K_0 H P^- = P^- H^T (R + H P^- H^T)^{-1} H P^- \tag{12}$$

is a symmetric matrix.

The prediction error covariance matrix $P^- = P_{k|k-1}$ (324) is calculated in covariance prediction unit 326 from a prior error covariance matrix $P^{++}$ stored in memory. The error covariance matrix is updated recursively using covariance update unit 330, as described below.

Covariance Prediction Unit. Covariance Prediction Unit 326 provides the prediction error covariance matrix $P^-$ (324) that is used in gain calculation unit 322 to compute Kalman gain matrix 314. For example, the covariance matrix of the prediction error may be computed as $$P_{k|k-1} = P^- = F_k P_{k-1|k-1} F_k^T + Q_k, \tag{13}$$

where $$F_k = \frac{\partial f}{\partial x} \bigg|_{\hat{x}_{k-1|k-1}, u_k}$$

is a Jacobian matrix of partial derivatives of the function f, $P_{k-1|k-1}$ is a covariance matrix of a prior estimation error and $Q_k$ is a covariance matrix of the noise vector $w_k$ (106 in FIG. 1).

Covariance Update Unit. Covariance Update Unit 330 provides the estimation error covariance matrix $P^{++}$ (328) from the prediction error covariance matrix $P^-$ (324). The covariance matrix of the estimation error is defined as $$P^{++} = P_{k|k} = \langle (x-\hat{x}^{++})(x-\hat{x}^{++})^T \rangle = \langle e^{++} e^{++T} \rangle. \tag{14}$$

The estimate error can be written in terms of the prediction error as $$e^{++} = x - \hat{x}^{++} \tag{15}$$

$$= x - \hat{x}^- - K(\tilde{z} - \hat{z}^-)$$

$$= x - \hat{x}^- - K(h(x) + v - h(\hat{x}))$$

$$\cong x - \hat{x}^- - K H (x - \hat{x}^-) - K v$$

$$= (I - KH) e^- - K v.$$

Using this expression, the covariance matrix of the estimation error is $$P^{++} = \langle e^{++} e^{++T} \rangle \tag{16}$$

$$= (I - KH) \langle e^- e^{-T} \rangle (I - KH)^T + K \langle vv^T \rangle K^T$$

$$= (I - KH) P^- (I - KH)^T + K R K^T$$

$$= P^- - KHP^- - P^- H^T K^T + K(HP^- H^T + R) K^T.$$

where $R = \langle vv^T \rangle$ and $P^- = \langle e^- e^{-T} \rangle$. In one embodiment of the disclosure, the covariance update unit 330 updates the matrix as $$P^{++} = (I - KH) P^- (I - KH)^T + K R K^T \tag{17}$$

The covariance matrix update may be written in terms of the Kalman gain matrix $K_0$ and the state update weights. Substituting $K = (I - \Gamma) K_0$ and using equation (2) gives $$P^{++} = (I - K_0 H) P^- + \Gamma K_0 H P^- \Gamma \tag{18}$$

$$= (I - K_0 H) P^- + \gamma \gamma^T \circ K_0 H P^-,$$

where $\circ$ denotes an entry-wise or Hadamard matrix product.

The update to the covariance matrix can be written in terms of the standard Kalman update. For the Kalman filter, the covariance matrix of the estimation error is defined as $P^+ = P_{k|k} \langle (x-\hat{x}^+)(x-\hat{x}^{+T}) \rangle = \langle e^+ e^{+T} \rangle$. The covariance matrix for the Kalman estimation error is updated as $$P^+ = (I - K_0 H) P^-. \tag{19}$$

where $P^+$ (332 in FIG. 3)

Noting that $K_0 H P^- = P^- - P^+$, the covariance matrix $P^{++}$ of the estimation error is updated $$P^{++} = P^+ + \Gamma(P^- - P^+)\Gamma, \tag{20}$$

or, equivalently, $$P^{++} = P^+ + \gamma \gamma^T \circ (P^- - P^+) = \gamma \gamma^T \circ P^- + (1 - \gamma \gamma^T) P^+. \tag{21}$$

where, again, the operator $\circ$ denotes an entry-wise or Hadamard matrix product and 1 denotes a matrix of ones. This form of the covariance update is implemented in covariance update unit 330 shown in FIG. 3, where the initial error covariance matrix $P^+$ (332) is combined with the prediction error covariance matrix $P^-$ (324) to provide the final error covariance matrix $P^{++}$ (328).

In component form, the covariance update can be written as $$P_{ij}^{++} = \gamma_i \gamma_j P_{ij}^- + (1 - \gamma_i \gamma_j) P_{ij}^+. \tag{22}$$

While equations (18) and (22) have been derived for an extended Kalman filter, this approach may be used for other estimators in which an error covariance matrix is first predicted and then updated. In addition, while equations (10) and (22) express the updates in terms of initial updates, it will be apparent to those of skill in the art that the computations may be implemented in any mathematically equivalent manner in a practical estimator.

The update to the covariance matrix $P^{++}$, described above, provides a mathematically correct update in that it maintains a consistent filter for a linear system in which the expected value of the error is zero and the expected value of variance of the error is $P^{++}$.

Selection of state update weights. The update weightings can be written as $\gamma_i = 1-\beta_i$, where $0 \leq \beta_i \leq 1$ is the proportion, of the standard update that is applied to the $i^{th}$ state in the filter. Each state can have its own unique $\beta$ value, and this value can change from update to update.

The value $\beta_i$ for each filter state (which may be time-varying or fixed), may be selected dependent upon knowledge of the system whose states are being estimated. For example, the value $\beta_i$ may be selected dependent upon the degree of nonlinearity in the system, with a lower value $\beta_i$ selected for higher degree of non-linearity. In one embodiment, for example, $\beta_i$ may set in the range [0.1,0.25] for fixed states and set approximately 0.5 for slowly time varying states. Full states may have a value of $\beta_i$ close to 1.0. The values of $\beta_i$ may be selected dependent on the characteristics of the system. The update weightings may be set for each state and each time step.

In one embodiment, a user sets $\beta_i$ for each filter state (again, $\beta_i$ can be time varying), and applies a modification to a standard Kalman filer update, as described in equations (26) and (27) below. This approach enables the advantages of disclosed state estimator to be achieved with relatively simple modification of the Kalman filter state estimator.

In a further embodiment, the values $\beta_i$ are set automatically by the estimator for each filter state.

In a further embodiment, the updates in equation (29) below may be used. It will be apparent to those of ordinary skill in the art that other mathematically equivalent updates may be used, resulting in implementations that are consistent with linear system theory.

At each update and for each state i, the value $\beta_i$ may varied or fixed. The use of variable $\beta_i$ values provides a mechanism improving performance of the estimator.

As special case, the disclosed estimator includes the extended Kalman Filter (EKF), the Schmidt-Kalman Filter (SKF), the intermittent Schmidt-Kalman filter (ISKF) and the fixed-weight partial-update Schmidt-Kalman Filter (FPSKF). The ISKF is a filter that sets $\beta_i$ to zero or one, but alternates some states between a full update and a Schmidt non-update. The choice of whether to update or is based on filter observability/information at the time. The FPSKF sets $\beta_i$ to be one for most states and fixed $\beta_i$ value in the range $0<\beta_i<1$ for a specific set of states. These partially updated states all share the same fixed weighting that does not vary with time or state. Again, each of the above filters is a special case of the PSKF equations presented earlier, but none provides the flexibility of weightings that may vary from state-to-state and from update-to-update, as provided by the disclosed estimator.

The disclosed estimator has been described above as an addition or modification to a discrete extended Kalman filter. However, the disclosure is not limited to this application, and may be used to improve other estimators, such as the UKF, Rao Blackwellized Particle filters, and others, and implemented in analog or digital form or a combination thereof.

A feature of the partial update approach disclosed above is that if the "parent" filter is unbiased and consistent for linear systems, the partial update is still unbiased (in that the expected value of the error is zero) and consistent (in this the recursively updated estimate of the error covariance is consistent with the actual error covariance).

Figure 4:
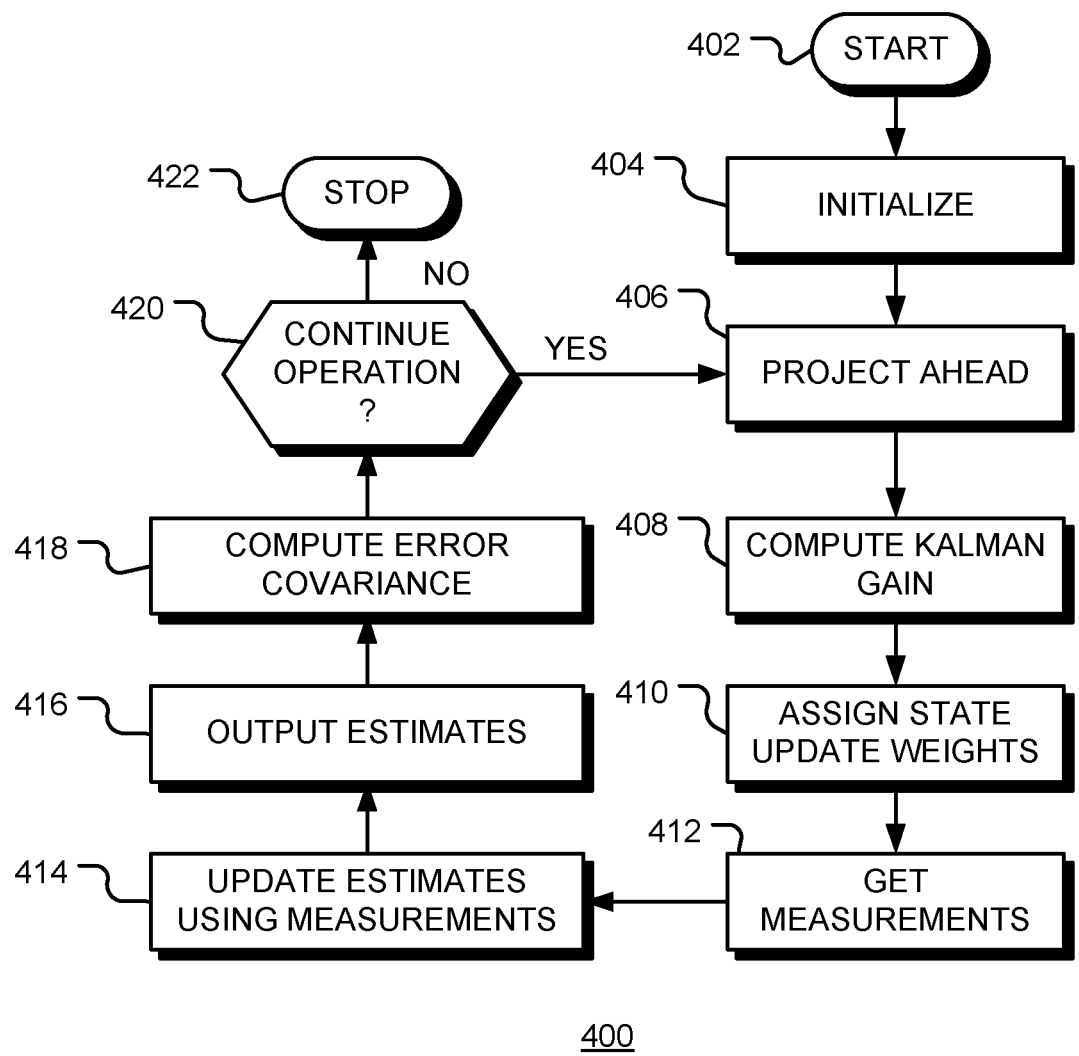
FIG. 4 is a flow chart of a method of state estimation for a physical system, in accordance with a representative embodiment.

FIG. 4 is a flow chart of a method 400 of state estimation for a physical system, in accordance with a representative embodiment. Following start block 402, initial values $i_{0|0}$ and $P_{0|0}$ are assigned for the states and the estimation covariance matrix, respectively, at block 404. The state estimates for discrete times k>0 are then obtained in an iterative manner as follows.

Prediction. At block 406, new states and measurements are predicted, together with an estimate of the prediction error, according to:

$$\hat{x}^- = \hat{x}_{k|k-1} = f(\hat{x}_{k-1|k-1}, u_k)$$

$$\hat{z}^- = \hat{z}_k = h(\hat{x}_{k|k-1})$$

$$P^- = P_{k|k-1} = F_k P_{k-1|k-1} F_k^T + Q_k. \quad (23)$$

Gain Calculation. At block 408, the Kalman gain is computed as:

$$K_0 = P^- H^T (R + H P^- H^T)^{-1}. \quad (24)$$

State Update Weight Assignment. At block 410, the state update weights $\gamma$ are assigned. The weights may be used to modify a Kalman filter, or may be used to calculate a modified gain $$K = (I - \Gamma) K_0. \quad (25)$$

where $\Gamma = \text{diag}(\gamma)$ is a diagonal matrix with diagonal elements $\Gamma_{ii} = \gamma_i$. The assignment of state update weights may be predetermined. Alternatively, the assignment may be dependent upon performance of the estimator (such as error covariance evolution) or dependent upon system non-linearity (such as non-linearity in the measurement function in a region surround the current state estimate. The size of the region may be determined from the error covariance matrix, for example, where larger errors indicate a larger region to the considered). Still further, the assignment of weights may be determined by experimentation. A combination of these assignment methods may be used.

At block 412, new measurements of the physical system are retrieved.

At block 414, the state estimates and the estimate error covariance matrix are updated and at block 416, the updated state estimates are output for further use. For example, the estimated states may be supplied to a control system configured to control the states of the physical system.

The estimation error covariance matrix is updated at block 418. If operation is to continue, as depicted by the positive branch from decision block 420, flow returns to block 406. Otherwise, as depicted by the negative branch from decision block 420, the method terminates at block 422.

The estimated state and the associated estimation error covariance matrix may be determined in various, mathematically equivalent, ways. Some examples are provided below.

Update: Modified Kalman Implementation
Initial (Kalman) update:

$$\hat{x}_+ = \hat{x}^- + K_0(\hat{z} - \hat{z}^-)$$

$$P^+ = (I - K_0 H) P^-. \quad (26)$$

Final update (weighted sum):

$$\hat{x}^{++} = \hat{x}^- + \Gamma(\hat{x}^- - \hat{x}^+) = \Gamma\hat{x}^- + (I - \Gamma)\hat{x}^+$$

$$P^{++} = P^+ + \Gamma(P^- - P^+)\Gamma = P^+ + \gamma\gamma^T \circ (P^- - P^+). \quad (27)$$

In component form (weighted sum):

$$\hat{x}_i^{++} = \gamma_i \hat{x}_i^- + (1-\gamma_i)\hat{x}_i^+.$$

$$P^{++} = (I-KH)P^-(I-KH)^T + KRK^T. \quad (29)$$

Update: Direct Implementation $$\hat{x}^{++} = \hat{x}^- + K(\tilde{z} - \hat{z}^-).$$

$$P^{++} = (I-KH)P^-(I-KH)^T + KRK^T. \quad (29)$$

In terms of the Kalman gain matrix $K_0$:

$$\hat{x}^{++} = \hat{x}^- + (I-\Gamma)K_0(\tilde{z} - \hat{z}^-)$$

$$P^{++} = (I-K_0H)P^- + \Gamma K_0 HP^-\Gamma = (I-K_0H)P^- + \gamma\gamma^T \circ K_0 HP^-. \quad (30)$$

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. Further, it will be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

I claim:

1. An apparatus having at least one processor for estimating states of a physical system, the apparatus comprising:
   a sensing system having a sensor to sense properties of the physical system to provide sensor signals, where the sensed properties are dependent upon the states of the physical system;
   a state update weight assignment unit programmed to assign a state update weight for each state of the physical system;

a state prediction unit programmed to predict the states of the physical system from previous estimated states of the physical system to provide predicted states;

a state update unit programmed, for each predicted state of the predicted states, to update the predicted state dependent upon a state update weight and the sensor signals, to provide updated estimated states;

a covariance prediction unit programmed to update a covariance matrix of errors in the predicted states to provide a prediction error covariance matrix; and a covariance update unit programmed to update a covariance matrix of errors in the updated estimated states dependent upon state update weights to provide an estimation error covariance matrix, where the state update unit provides the updated estimated states as output;

a controller configured to receive the updated estimated states and producing one or more control signals therefrom; and an actuator system configured to receive the one or more control signals and drive one or more actuators to provide inputs to the physical system, where predicting the states of the physical system from the previous estimated states of the physical system is dependent, directly or indirectly, upon the control signals.

2. The apparatus of claim 1, where the update to the predicted state comprises a product of a gain matrix and an error between the sensor signals and predicted sensor signals, and where the gain matrix is dependent upon the estimation error covariance matrix.

3. The apparatus of claim 1, where the state update weight for each state is greater than or equal to zero and less than or equal to one.

4. The apparatus of claim 1 where, for each predicted state of the predicted states, updating the predicted state comprises:

updating the predicted state dependent upon the sensor signals, to provide an initial estimated state; and forming a weighted sum of the predicted state and the initial estimated state using a state update weight for the state.

5. The apparatus of claim 4 where, updating the the covariance matrix of error in the predicted state between the estimated states and the current states comprises:

updating the covariance matrix of error in the predicted state to provide an initial covariance matrix; and forming a weighted sum of the initial covariance matrix and the covariance matrix of error in the predicted state using the state update weights.

6. The apparatus of claim 1, where state update weight assignment unit is further configured to: determine an observability of a state of the physical system; and assign the state update weight for the state dependent upon the observability of the state.

7. The apparatus of claim 1, where the sensor signals are dependent upon the states of the physical system through a non-linear measurement function, and where the state update weight assignment unit is further configured to:

determine a degree of non-linearity in the measurement function in a region around the predicted or estimated states; and assign the state update weight for the state dependent upon the degree of non-linearity.

8. The apparatus of claim 1, where the state update weight assignment unit is further configured to:

monitor the prediction error covariance matrix or estimation error covariance matrix over one or more iterations; and assign the state update weight for the state dependent upon the prediction error covariance matrix or the estimation error covariance matrix.

9. An apparatus for estimating states of a physical system, the apparatus comprising:

a sensing system configured having a sensor to sense properties of the physical system to provide sensor signals, where the sensed properties are dependent upon the states of the physical system;

a hardware processor, responsive to the sensor signals that, for each iteration of a plurality of iterations:

assigns a state update weight for each state of the physical system;

predicts the states of the physical system from previous estimated states of the physical system to provide predicted states;

for each predicted state of the predicted states, updates the predicted state dependent upon a state update weight and the sensor signals, to provide updated estimated states;

updates a covariance matrix of errors in the predicted states to provide a prediction error covariance matrix;

updates a covariance matrix of errors in the updated estimated states dependent upon state update weights to provide an estimation error covariance matrix;

provides the updated estimated states as output;

a controller configured to receive the updated estimated states and producing one or more control signals therefrom; and an actuator system configured to receive the one or more control signals and drive one or more actuators to provide inputs to the physical system, where predicting the states of the physical system from the previous estimated states of the physical system is dependent, directly or indirectly, upon the control signals.

10. The apparatus of claim 9, where the state update weight for each state is greater than or equal to zero and less than or equal to one.

11. The apparatus of claim 9, where, for each predicted state of the predicted states, updating the predicted state comprises:

updating the predicted state dependent upon a gain matrix and the sensor signals, to provide an initial estimated state; and forming a weighted sum of the predicted state and the initial estimated state using a state update weight for the state.

12. The apparatus of claim 11, where, updating the covariance matrix of error in the predicted state between the estimated states and the current states comprises:

updating the covariance matrix of error in the predicted state dependent upon the gain matrix to provide an initial covariance matrix; and forming a weighted sum of the initial covariance matrix and the prior covariance matrix using the state update weights.

13. The apparatus of claim 9, where the hardware processor is further configured to: determine an observability of a state of the physical system; and assign the state update weight for the state dependent upon the observability of the state.

14. The apparatus of claim 9, where the sensor signals are dependent upon the states of the physical system through a non-linear measurement function, and where the hardware processor is further configured to:
  determine a degree of non-linearity in the measurement function in a region around the predicted or estimated states; and
  assign the state update weight for the state dependent upon the degree of non-linearity.

15. The apparatus of claim 9, where the hardware processor is further configured to:
  monitor the prediction error covariance matrix or estimation error covariance matrix over one or more iterations; and
  assign the state update weight for the state dependent upon the prediction error covariance matrix or the estimation error covariance matrix.

16. A method for estimating states of a physical system, the method comprising:
  sensing properties of the physical system to provide sensor signals, where the sensed properties are dependent upon the states of the physical system;
  for each iteration of a plurality of iterations performed by a hardware processor: assigning a state update weight for each state of the physical system;
  predicting the states of the physical system from previous estimated states of the physical system to provide predicted states;
  for each predicted state of the predicted states, updating the predicted state dependent upon a gain matrix, a state update weight and the sensor signals, to provide updated estimated states;
  updating a covariance matrix of errors in the predicted states to provide a prediction error covariance matrix;
  updating a covariance matrix of errors in the updated estimated states dependent upon the gain matrix and state update weights to provide an estimation error covariance matrix;
  providing the updated estimated states as output;
  receiving, by a controller, the updated estimated states;
  producing, by the controller, one or more control signals dependent upon the received updated estimated states; and
  producing, by an actuator system responsive to the one or more control signals, control inputs to the physical system;
  where predicting the states of the physical system from the previous estimated states of the physical system is dependent upon the control signals.

17. The method of claim 16, where the state update weight for each state is greater than or equal to zero and less than or equal to one.

18. The method of claim 16, where, for each predicted state of the predicted states, updating the predicted state comprises:
  updating the predicted state dependent upon the gain matrix and the sensor signals, to provide an initial estimated state; and
  forming a weighted sum of the predicted state and the initial estimated state using a state update weight for the state.

19. The method of claim 18, where, updating the covariance matrix of error in the predicted state between the estimated states and the current states comprises:
  updating the covariance matrix of error in the predicted state dependent upon the gain matrix to provide an initial covariance matrix; and
  forming a weighted sum of the initial covariance matrix and the prior covariance matrix using the state update weights.

20. The method of claim 16, further comprising:
  determining an observability of a state of the physical system; and
  assigning the state update weight for the state dependent upon the observability of the state.

21. The method of claim 16, where the sensor signals are dependent upon the states of the physical system through a non-linear measurement function, and the method further comprising:
  determining a degree of non-linearity in the measurement function in a region around the predicted or estimated states; and
  assigning the state update weight for the state dependent upon the degree of non-linearity.

22. The method of claim 16, further comprising:
  monitoring the prediction error covariance matrix or estimation error covariance matrix over one or more iterations; and
  assigning the state update weight for the state dependent upon the prediction error covariance matrix or the estimation error covariance matrix.

23. The method of claim 16 further comprising a non-transitory computer readable medium storing a program of instructions when executed on a hardware processor.

* * * * *